UNITED STATES PATENT OFFICE.

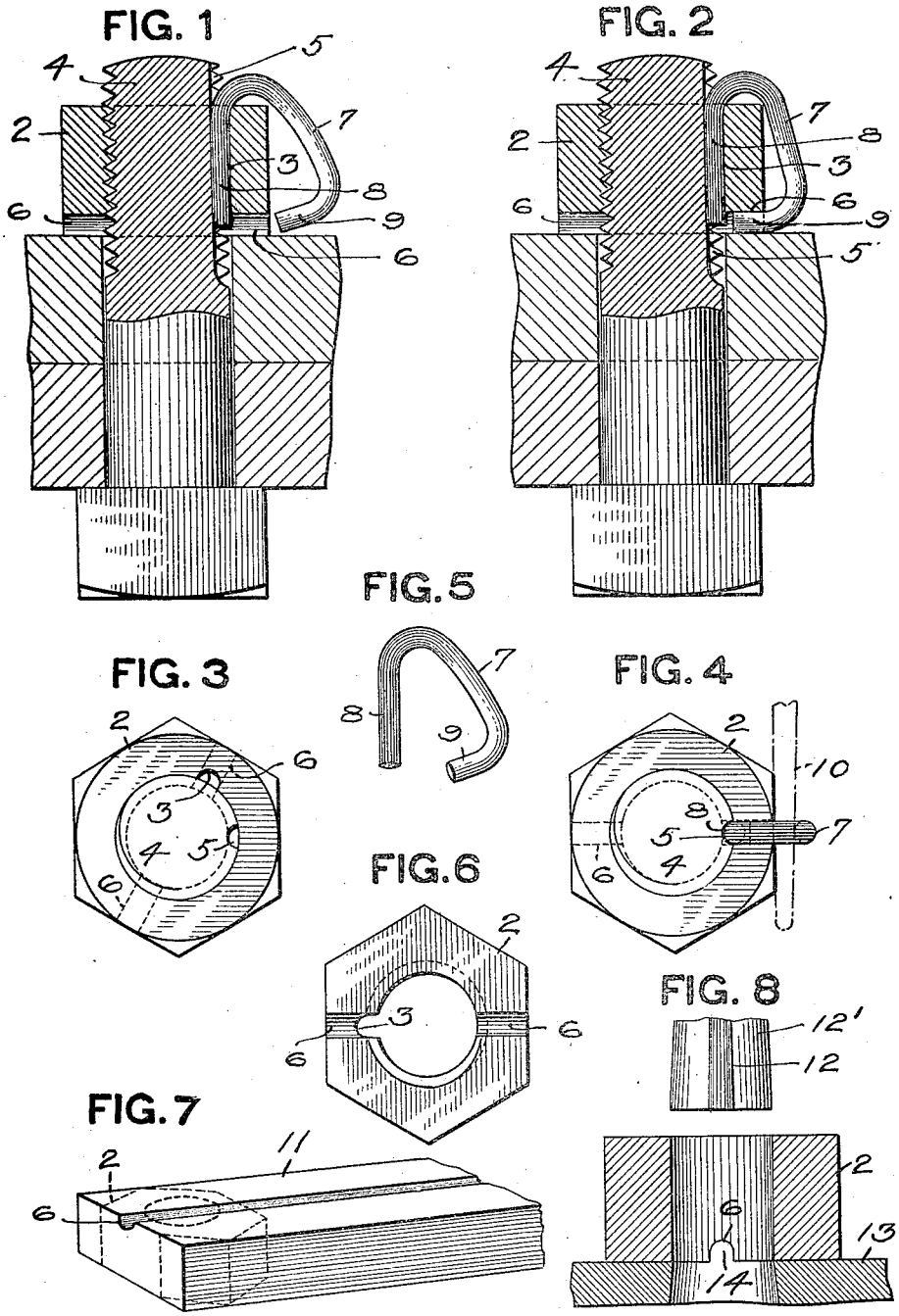

HARRY HERMAN, OF PITTSBURGH, PENNSYLVANIA, ASSIGNOR OF ONE-HALF TO JACOB HERMAN, OF PITTSBURGH, PENNSYLVANIA.

NUT AND BOLT LOCK.

1,133,860.

Specification of Letters Patent.

Patented Mar. 30, 1915.

Application filed July 19, 1913. Serial No. 780,058.

*To all whom it may concern:*

Be it known that I, HARRY HERMAN, a citizen of the United States of America, residing at Pittsburgh, in the county of Allegheny and State of Pennsylvania, have invented new and useful Improvements in Nut and Bolt Locks, of which the following is a full, clear, and exact description, reference being had to the accompanying drawings, which form part of this specification.

This invention relates to means whereby a nut may be positively locked to its bolt or vice versa, the general object being to provide an improved construction which shall be simple, strong and durable in construction and easy to lock and unlock.

A further object of my invention is to provide a lock of the above character, which does not require special machine work in the making thereof but in which parts of the locking elements of the nut and bolt may be formed in the making of the nut and bolt themselves.

Another object of my invention is to provide an individual lock nut, or in other words, a lock which will permit of locking of the nut to the bolt or similar threaded structure independently of an under nut or other object or sub-structure, as well as with such nut.

I will now describe my invention, in connection with the accompanying drawings, so that others skilled in the art to which it appertains may understand and construct the same, it being premised, however, that changes will occur to those skilled in the art, which would not be departures from my invention as set forth in the appended claims.

Figure 1 is a longitudinal sectional view of a nut lock embodying my invention, a portion of the bolt being in elevation, and showing the locking device in position preparatory to locking thereof against displacement; Fig. 2 is a similar view but showing the nut and bolt locked together and the locking device in locking position; Fig. 3 is a top plan view of a nut and bolt showing the said members as having complementary recesses for the reception of the locking member; Fig. 4 is a top plan view of Fig. 2 and showing the application of a tool for removing the locking device; Fig. 5 is a perspective view of the locking device; Fig. 6 is a bottom plan view of a nut showing formation of a recess for the reception of the locking device; Fig. 7 is a perspective view showing a bar or strip of stock from which the nut may be punched; and Fig. 8 is a sectional view showing a base or support for holding the nut during punching thereof, all views to be hereinafter more fully described.

Referring to the drawings, there is shown a nut 2 of the usual hexagonal shape, but, of course, it will be understood that the invention is not limited to the particular shape of a nut or a particular kind of bolt, as my invention finds ready adaptation to the general or commercial form of nuts and bolts.

The usual threaded opening of the nut has a notch or recess 3 and the bolt 4, has formed in the threaded shank thereof, a complementary longitudinal groove or recess 5, while extending across the bottom face of the nut, and preferably in registry or alinement with the groove or recess 3 is another recess 6.

To lock the nut to the bolt I provide a locking member 7. After the nut is applied to the bolt and the recesses 3 and 5 have been brought opposite one another so as to form a key-way between the nut and the bolt, the finger or shank 8 of the locking device is inserted in said keyway, in the manner shown in Fig. 1. This brings an opposite angularly disposed terminal 9 of the locking device into position for reception thereof by the recess 6, after which the said terminal 9 or end of the locking device 7 is driven into the recess 6, as shown in Fig. 2. Driving of the portion 9 into the recess 6, locks the member 7 in position so that the shank 8 is prevented from accidental withdrawal. The depth and location of the recess or groove 6 are such that the portion 9 of the locking member may lie wholly therewithin, the end of said member being thus substantially inclosed and consequently protected against accidental dislodgment by contact with external objects. Moreover, as shown in Figs. 1 and 2, when the nut is turned down on its bolt into abutment with the surface of a plate or other body through which the bolt passes, the groove 6 on the inner end of the nut forms with the abutting plate a recess entirely closed except at its outer end. When the portion 9 of the locking member is driven into this recess, the end of said member is wholly inclosed and protected.

To remove the locking member 7, a tool, such as a tool 10, as shown in Fig. 4, may be inserted between the body of the locking device and the adjacent wrench face of the nut, for the purpose of withdrawing the end 9 from the recess 6, thus permitting ready withdrawal of the shank 8 from the pocket formed by the recesses 3 and 5. The nut or bolt may then be re-set or removed as desired.

In order to facilitate removal of the member 7 by means of a wedging tool, it is best to so proportion the locking member, that when the end 9 thereof has been driven into the groove or recess 6, there is left between the bent-over portion of member 7 and the adjacent lateral or wrench face of the nut a space into which such tool may be readily inserted, this arrangement being most clearly shown in Fig. 2 of the drawings.

It will be seen that my invention presents a structure which does not require special machine work. The groove 5 may be formed in the bolt blank in the making of the bolt and, as shown in Fig. 7, the recess 6 may be rolled or otherwise formed in the bar or strip of stock 11 from which the nut may be punched or made. In the punching of the nut to form the usual bolt opening thereof the recess 3 may be simultaneously formed, as by having a projecting portion 12, (see Fig. 8) formed on the die 12' which makes the bolt opening.

In Fig. 8 I also show a die base or support 13 having a bead or projecting rib 14 which fits into the recess 6 of the nut or blank and serves to prevent flattening of the recessed bottom of the nut in the punching of the bar or strip 11 and of the bolt hole therein.

The locking member 7 may be formed from any suitable shape of stock and ordinary wire may be used for this purpose. Said locking member may be provided with a protective coating, and an extra operation to provide this coating, in this particular device, may be obviated by employing the usual galvanized wire or rod.

The advantages of my invention will be appreciated by those skilled in the art since I am enabled to provide a lock that is not only cheap to manufacture but in which an absolute or positive lock effect is obtained. Furthermore, the device may be readily unlocked for the purpose of removing the nut or for resetting or tightening it.

Having thus described my invention, what I claim and desire to secure by Letters Patent is:

A device of the character described, comprising a screw threaded nut and a bolt therefor, the nut being provided with an inner longitudinal groove extending throughout its length and with a transverse groove on one face extending from said longitudinal groove to the outside of the nut, said bolt being provided with a longitudinal groove at least as long as said nut, and a locking device having a shank portion for insertion in said longitudinal groove and a projection arranged for insertion in said transverse groove.

In testimony whereof I have hereunto set my hand.

HARRY HERMAN.

Witnesses:
M. A. KELLER,
E. I. BARTH.

Copies of this patent may be obtained for five cents each, by addressing the "Commissioner of Patents, Washington, D. C."